April 27, 1926. 1,582,088
W. H. SHANKS
STEERING WHEEL AND SWITCH ASSEMBLY
Filed Sept. 29, 1924 2 Sheets-Sheet 1
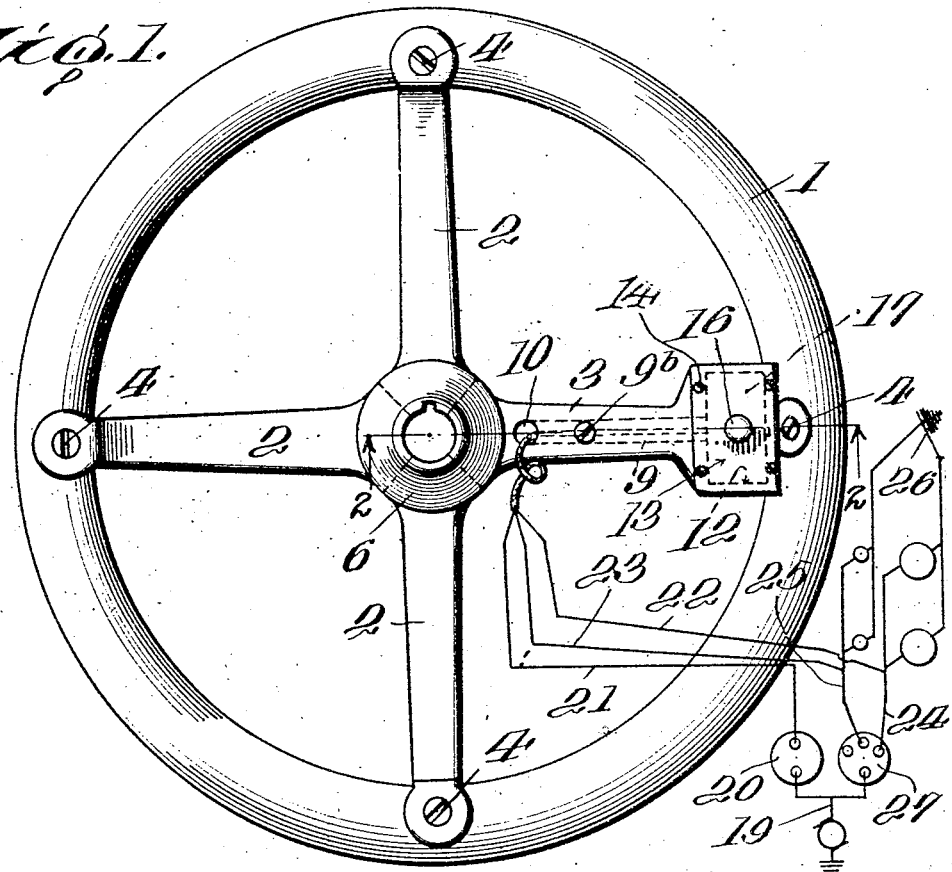
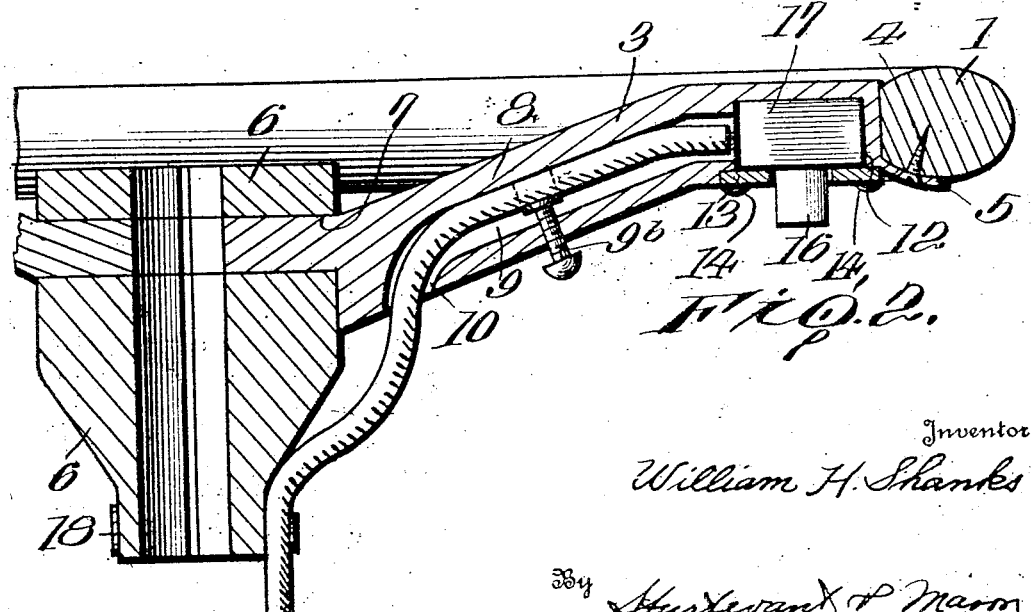
Inventor
William H. Shanks

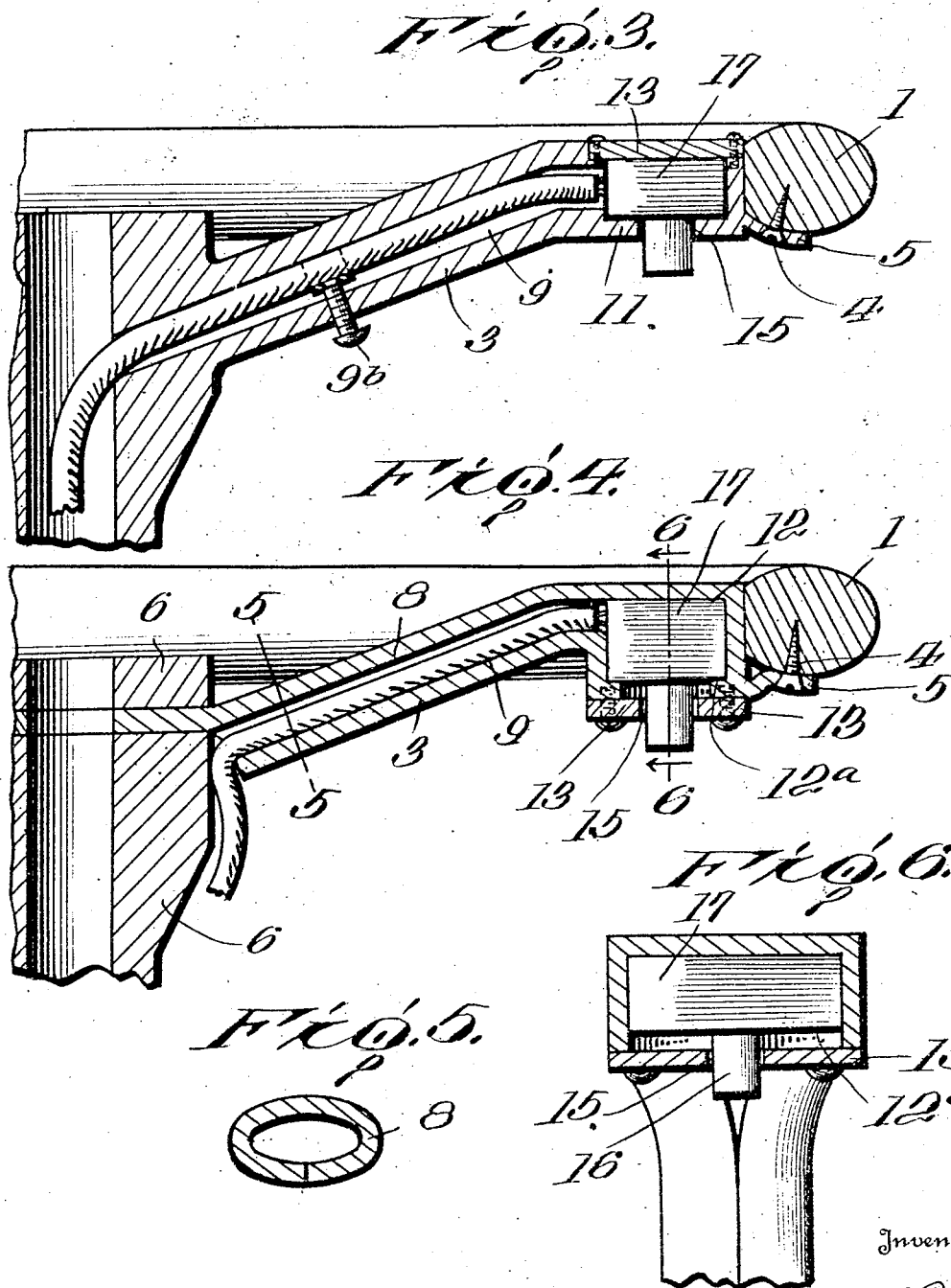

Patented Apr. 27, 1926.

1,582,088

UNITED STATES PATENT OFFICE.

WILLIAM H. SHANKS, OF FRANKFORT, KENTUCKY.

STEERING WHEEL AND SWITCH ASSEMBLY.

Application filed September 29, 1924. Serial No. 740,597.

*To all whom it may concern:*

Be it known that I, WILLIAM H. SHANKS, a citizen of the United States, residing at Frankfort, in the county of Franklin, State of Kentucky, have invented certain new and useful Improvements in Steering Wheels and Switch Assemblies, of which the following is a description, reference being had to the accompanying drawing and to the figures of reference marked thereon.

An object of the present invention is to provide the steering wheels of automobile vehicles with a switch which may be used to control the circuit on the automobile.

Another object is the provision of an integral receiving member on the wheel to contain and protect the elements of the switch.

A further object is to dispose the switch in a protected position, and with its operative button carried at a point within easy normal access to the finger of the operator of the automobile.

Another object of the invention is the provision of a switch-receiving construction which constitutes a part of the spider of a separable steering wheel, and which may be applied to existing constructions without the necessity of replacing the entire steering wheel.

With these and other objects in view, the invention resides in the novel arrangement and construction of the parts, and will be more fully described hereinafter, and particularly pointed out in the claims.

In the accompanying drawings are set forth exemplifications of the invention, to illustrate the application of the principle of the invention to present-day types of steering wheels.

Figure 1 is a bottom plan view with a diagrammatic representation of a permissible circuit used in connection therewith;

Fig. 2 is a cross section on the line 2—2 of Fig. 1;

Fig. 3 is a view, similar to Fig. 2, showing a fragment of a modified construction; and Figures 4, 5 and 6 show a further modification in longitudinal and transverse sections.

In these drawings, the steering wheel is represented as composed of the handle or grip rim 1 and a plurality of separable spider arms 2, 2, 2, 3, of which the arms designated at 2 are of the type commonly used in separable steering wheels, and the arm 3 is of the construction according to my invention. These several arms are connected to the rim 1 by the screws 4, which pass through the downwardly bent end members 5 of the respective arms. The central portions of these arms are held together by washers or bushings represented at 6 by way of convention.

Referring more particularly to the arm 3, as shown in Fig. 2, it will be seen that the arm is comprised of the inner portion 7 which is adapted to be clamped by the washers or bushings on the wheel post. The run of the arm indicated at 8 has a passage 9 extending along it, from a point 10 adjacent the clamp bushing, at which it opens to the outside. Near the steering wheel rim 1, this arm carries a chamber 11 formed with a pocket 12, which is closed by a cover 13 held in position by screws 14. The chamber is formed with an aperture 15 at its bottom to permit the passage of the button 16 of a three-way switch 17 of the single button type. This switch may be of any of the well known constructions, and its details of assembly form no part of my invention: suffice it to say that it operates to close alternately one or the other of two circuits, upon the successive actuation of the single push button.

It will be noted that the location of this button on the under side of the arm brings it within easy reach of the finger of the automobile driver, and at the same time, it is in a large measure protected against accidental movement. The cover 13 is formed with a water-tight joint on the chamber 12, so that driving rains cannot find entrance and access to the switch. This assures the switch against short-circuiting from such causes, and the aperture 15 on the bottom is prevented by its position from admitting a stream of water into the said chamber 12.

Referring to the wiring diagram shown in connection with Fig. 1, the three wires leading from the switch 17 are carried through a hollow arm 3 to the opening 10. From this, they are carried down the line of the steering shaft, thence to the dash board, where they are connected, for example, in the manner shown. To prevent sagging of the wires, a thumb screw with a broad head or the like which will prevent cutting the insulation, is passed through the lower portion of the arm as shown at 9ᵇ. Suitable clips 18 may be provided to secure the wires to the steering shaft and associated members. On the dash board, the three wires are connected as follows: Wire 19, which is the power wire, is led through a switch 20 to the power main 21 of the electrical system of the automobile. Wires 22, 23 which are alternately energized by means of the switch, lead to the two lighting wires 24, 25 of the automobile system: 24 being the "full" light and 25 the "dim" light circuit, passing through the respective bulbs and leading to the ground at 26.

It will thus be seen that the switch is in reality shunted around the ordinary dash switch represented at 27, and forms a very suitable substitute for the latter in dimming and re-lighting the headlights of the automobile. The ready access to the switch button in this position according to this invention, enables the operator to dim his headlights while retaining full control of his vehicle with both hands, and without taking his eyes from the passing vehicle at the most critical moment.

In Fig. 3, I have shown a fragmentary section of a solid steering wheel, in which the spokes and hub are formed integrally. In this construction, also, the passage 9 in the arm is extended to the interior of the hub so that the connecting wires may be passed from the switch through the spoke and the hollow steering shaft to the dashboard without being exposed along the length of the steering shaft. A further modification consists in that the cover 13 is applied on the top of the spoke, and the push button 16 passes through the bottom wall of the chamber 12.

In Figures 4, 5 and 6, I have shown a construction in which the spoke is formed from sheet metal bent into the necessary tubular shape, as shown in cross section in Fig. 5. The outer end of the spoke is formed with the chamber 12, which is likewise punched up from a single blank, and has its end wall formed with the inwardly extending lugs 12ᵃ to receive the fastening screws for the cover 13 and the outwardly extending lug 5 to be fastened to the wheel rim. This modified form is somewhat cheaper in construction than those set forth above.

It is obvious that this spider arm construction may be employed with any type of switch for closing or selecting between circuits on an automobile, and that it is not limited in details of arrangement and construction to the specific modification shown, but that any changes may be made therein within the scope of the appended claims.

Having thus described the invention, what is claimed as new is:—

1. In a steering wheel, a rim, a hub, spider arms connecting said rim and said hub, one of said arms being hollow and having adjacent its outer end a chamber open downwardly, a switch block in said chamber, means to hold said block in said chamber and substantially seal said chamber against the entrance of water, and electrical conductors leading from said switch block and located within said hollow arm.

2. In a steering wheel, a rim, a hub, spider arms connecting said rim and said hub, one of said arms being hollow and having its cavity enlarged adjacent the rim end to form a chamber with a downwardly directed opening, a switch block introduced into said chamber and removable therefrom as a unit, and means to secure said block in said chamber, and substantially exclude water from said chamber.

3. A spider arm for the steering wheel of a vehicle formed of a folded sheet of metal with a central wire conduit, with an inner end portion to be clamped upon the steering column and an outer end portion folded to form a switch-receiving pocket open at the bottom, said conduit and said outer end portion presenting a continuous closed top, the extreme end portion of said arm being folded downward to close the end of said pocket and then bent outward at a substantial angle to form an ear for attachment to the steering wheel rim.

In testimony whereof I affix my signature.

WILLIAM H. SHANKS.